(12) United States Patent
Rovira et al.

(10) Patent No.: US 8,825,444 B1
(45) Date of Patent: Sep. 2, 2014

(54) AUTOMATED SYSTEM CHECK FOR METROLOGY UNIT

(75) Inventors: Pablo I. Rovira, San Francisco, CA (US); Jaime Poris, Boulder Creek, CA (US); Jonathan M. Madsen, Sunnyvale, CA (US); Scott D. Penner, Mountain View, CA (US)

(73) Assignee: Nanometrics Incorporated, Milpitas, CA (US)

( * ) Notice: Subject to any disclaimer, the term of this patent is extended or adjusted under 35 U.S.C. 154(b) by 664 days.

(21) Appl. No.: 12/555,721

(22) Filed: Sep. 8, 2009

Related U.S. Application Data (62) Division of application No. 11/134,679, filed on May 19, 2005, now abandoned.

(51) Int. Cl.
| | | |
|---|---|---|
| *G06F 11/30* | (2006.01) | |
| *G21C 17/00* | (2006.01) | |
| *G01C 25/00* | (2006.01) | |
| *G01D 18/00* | (2006.01) | |
| *G06F 11/34* | (2006.01) | |
| *G05B 23/02* | (2006.01) | |

(52) U.S. Cl.
CPC .......... *G06F 11/3409* (2013.01); *G05B 23/024* (2013.01)
USPC ............................ 702/182; 702/104; 702/183

(58) Field of Classification Search
CPC ............ G06F 11/3409; G06F 11/3447; G06F 11/2257; G05B 23/02; G05B 23/024; G01D 3/022; G01D 18/008; G01D 18/00; G01P 21/00; H01L 22/20
USPC .......................................... 702/182, 183, 104
See application file for complete search history.

(56) References Cited

U.S. PATENT DOCUMENTS

| | | |
|---|---|---|
| 4,386,850 A | 6/1983 | Leahy |
| 5,214,486 A | 5/1993 | DeWitt |
| 5,327,286 A | 7/1994 | Sampsell et al. |

(Continued)

FOREIGN PATENT DOCUMENTS

| | | |
|---|---|---|
| JP | 62038373 A | 2/1987 |
| JP | 4343246 A | 11/1992 |
| JP | 6175876 A | 6/1994 |
| JP | 9288146 A | 11/1997 |

OTHER PUBLICATIONS

Office Action mailed on Feb. 12, 2008, for U.S. Appl. No. 11/134,679, 14 pgs.

(Continued)

*Primary Examiner* — Michael Nghiem
(74) *Attorney, Agent, or Firm* — Silicon Valley Patent Group LLP (57) ABSTRACT

A metrology unit includes an integrated reference target with which an automated system check process is performed. The automated system check process includes measuring a feature on the reference target and determining if the measurement is within a desired specification for the metrology unit. When the metrology unit fails the automated system check, or if otherwise warranted, an automated diagnosis process may be performed using the same integrated reference target. The automated system check and automated diagnosis may be optimized based on correlations between parameters of the automated qualification and parameters of the automated diagnosis. Similarly, the measurement of a processed wafer may be optimized based on a correlation between parameters of the metrology of the processed wafer and parameters of the automated system check.

7 Claims, 8 Drawing Sheets

(56) References Cited

U.S. PATENT DOCUMENTS

| | | | |
|---|---|---|---|
| 5,550,634 A | 8/1996 | Nakamura | |
| 5,978,743 A | 11/1999 | Kiyono | |
| 6,073,501 A | 6/2000 | Rohner | |
| 6,208,425 B1 | 3/2001 | Sandhu et al. | |
| 6,317,991 B1 | 11/2001 | Rinn | |
| 6,323,776 B1 | 11/2001 | Jackson et al. | |
| 6,433,561 B1 | 8/2002 | Satya et al. | |
| 6,515,469 B2 | 2/2003 | Nishida | |
| 6,618,692 B2 | 9/2003 | Takahashi | |
| 6,740,534 B1 * | 5/2004 | Adams, III et al. | 438/14 |
| 6,795,193 B2 | 9/2004 | Schulz | |
| 6,898,557 B2 | 5/2005 | Wegener | |
| 6,941,792 B2 | 9/2005 | Isozaki et al. | |
| 6,989,896 B2 | 1/2006 | Wen et al. | |
| 7,054,006 B2 | 5/2006 | Wang et al. | |
| 7,062,397 B1 | 6/2006 | Minor | |
| 7,078,691 B2 | 7/2006 | Nakayama | |
| 7,102,763 B2 * | 9/2006 | Ritzdorf et al. | 356/630 |
| 7,225,107 B2 | 5/2007 | Buxton et al. | |
| 7,248,939 B1 * | 7/2007 | Chamness et al. | 700/121 |
| 7,262,865 B2 | 8/2007 | Mui et al. | |
| 7,289,212 B2 | 10/2007 | Kwan | |
| 7,355,729 B2 | 4/2008 | Park et al. | |
| 7,405,580 B2 | 7/2008 | Marinskiy | |
| 7,720,559 B1 * | 5/2010 | Stewart | 700/121 |
| 2002/0039030 A1 * | 4/2002 | Khazei | 324/750 |
| 2003/0076126 A1 | 4/2003 | Grebner et al. | |
| 2004/0029299 A1 * | 2/2004 | Pasadyn et al. | 438/5 |
| 2004/0157142 A1 | 8/2004 | Smith et al. | |
| 2005/0010311 A1 | 1/2005 | Barbazette et al. | |
| 2005/0118812 A1 * | 6/2005 | Donohue et al. | 438/689 |
| 2005/0192698 A1 * | 9/2005 | Cheng et al. | 700/121 |
| 2005/0193281 A1 * | 9/2005 | Ide et al. | 714/47 |
| 2005/0234574 A1 * | 10/2005 | Lam et al. | 700/96 |
| 2006/0058979 A1 | 3/2006 | Markle et al. | |
| 2006/0095232 A1 * | 5/2006 | Purdy | 702/185 |
| 2006/0113556 A1 | 6/2006 | Hughes | |

OTHER PUBLICATIONS

Response to Office Action mailed on May 12, 2008 for U.S. Appl. No. 11/134,679, filed May 19, 2005, by Rovira et al., 11 pgs.

Office Action mailed on Sep. 4, 2008, for U.S. Appl. No. 11/134,679, 13 pgs.

Response to Office Action mailed on Nov. 26, 2008 for U.S. Appl. No. 11/134,679, filed May 19, 2005, by Rovira et al., 10 pgs.

Final Office Action mailed on Mar. 5, 2009, for U.S. Appl. No. 11/134,679, 13 pgs.

Response to Final Office Action mailed on Jun. 4, 2009, for U.S. Appl. No. 11/134,679, filed May 19, 2005, by Rovira et al., 9 pgs.

Advisory Action mailed on Jun. 26, 2009, for U.S. Appl. No. 11/134,679, 3 pgs.

RCE with Response to Office Action mailed on Sep. 8, 2009, for U.S. Appl. No. 11/134,679, filed May 19, 2005, by Rovira et al., 8 pgs.

Response to Notice of Non-Compliant Amendment mailed on Nov. 2, 2009, for U.S. Appl. No. 11/134,679, filed May 19, 2005, by Rovira et al., 5 pgs.

Office Action mailed on Mar. 5, 2010 for U.S. Appl. No. 11/134,679, filed May 19, 2005 by Rovira et al., 13 pages.

Response to Office Action mailed on Jun. 7, 2010 for U.S. Appl. No. 11/134,679, filed May 19, 2005 by Rovira et al., 11 pages.

Final Office Action mailed on Aug. 17, 2010 for U.S. Appl. No. 11/134,679, filed May 19, 2005 by Rovira et al., 16 pages.

Machine Translation in English of Abstract for JP 9288146A visited at <www.espacenet.com> on Feb. 3, 2012, 1 page.

Machine Translation in English of Abstract for JP 4343246A visited at <www.espacenet.com> on Feb. 3, 2012, 1 page.

Machine Translation in English of Abstract for JP 6175876A visited at <www.espacenet.com> on Feb. 3, 2012, 1 page.

Machine Translation in English of Abstract for JP 62038373A visited at <www.espacenet.com> on Feb. 3, 2012, 1 page.

* cited by examiner

AUTOMATED SYSTEM CHECK FOR METROLOGY UNIT

CROSS-REFERENCE TO RELATED APPLICATION

This application is a divisional of U.S. patent application Ser. No. 11/134,679, filed May 19, 2005, entitled "Automated System Check of a Metrology Unit", now abandoned, which is incorporated herein by reference in its entirety.

FIELD OF THE INVENTION

The present invention is related to system checks in metrology systems and, in particular, to an automatic process for performing system checks in metrology units.

BACKGROUND

Due to the shrinkage of microcircuit dimensions, current and future semiconductor fabrication technologies, such as film deposition, lithography, film etch, and chemical mechanical planarization, require ever increasing process quality control and process yield. Moreover, the increase in wafer size from 200 mm to 300 mm also increases the demand for tighter process control because more chips are fabricated in a single wafer and, accordingly, losing a single wafer due to a process failure results in a higher loss.

To achieve better process control and improve fabrication yields, semiconductor manufacturers are adopting metrology systems as an integral part of their process control. The metrology system can measure and provide a wafer parameter, such as the thickness of a deposited thin film, to the process tool, which can adjust a process parameter to either correct the processed wafer in a subsequent process step or correct the previous process step for subsequent wafers. The technology of measuring a given parameter (or many parameters) and feeding back and/or forward the information to the process is generally known as Advanced Process Control (APC).

For faster information feed back and therefore better yield, the industry is adopting what is known as Integrated Metrology®. Integrated Metrology® (IM) systems are small-footprint, high precision measurement tools, which can be physically attached to the process tool and are an integrated part of the manufacturing process. In relation to Stand Alone (SA) metrology systems, IM systems have several advantages when used for APC. For example, through the use of IM, the time between the end of a process and measurement for verification is drastically reduced, which reduces the APC cycle time by permitting the measured parameters to be fed back or forward into the process cycle much earlier than with a SA system. A reduced APC cycle time results in tighter process control from wafer to wafer, or even from lot to lot. Further, because a deviation from the specified target parameter is detected earlier with an IM system, wafers that could potentially be miss-processed are saved due to the faster APC cycle time. Finally, an added advantage is the lower exposure of wafers to risks such as breakage and contamination, since the integration of the metrology unit into the process tool reduces wafer traffic compared to the wafer transportation necessary with SA systems.

The demand for system reliability in an IM system, however, is higher than for an SA system, because the IM system forms an integral part of the process cycle or production line. In fact, an IM system requires increased system reliability in terms of both the number of failures and measurement performance degradation. The failure of the IM system may stop the production line for many hours until service is performed on the tool. Measurement performance degradation of the IM system may result in incorrect information being fed back or forward to the process tool. The process tool will then unnecessarily adjust process parameters based on the incorrect information, which could result in many wafers being miss-processed.

Accordingly, system checks are routinely performed on a daily or monthly basis to assure measurement reliability of the IM systems. Common system checks include precision, stability and accuracy. For the case of thin film and critical dimension (CD) metrology tools based on optical spectroscopy, such as reflectometry or ellipsometry, it is common to use wafers that have standardized films or CD features, made of stable materials such as Silicon Oxide ($SiO_2$) to perform the system checks. These standards are pre-characterized using a high accuracy system. System checks for IM systems require the introduction of the standard wafer into the process tool, which is disadvantageous because it interferes with the process cycle and reduces the number of slots available to production wafers.

Other types of optical metrology tools, such as those that measure overlay error, reflectivity, color, defects, and non-optical metrology tools, such as those that measure film capacitance, conductive film thickness, conductive film sheet resistance, conductive film inductance, conductive film magnetic properties, geometric shape, and vertical step height, may similarly benefit from the use of standard wafers with pre-characterized features in system checks.

Accordingly, there is a need for improved system checks for metrology systems and, in particular, for metrology systems that will minimize the interference with the process cycle.

SUMMARY

A metrology unit, in accordance with an embodiment of the present invention, may include an integrated reference target with which a system check may be performed. The integrated reference target includes a plurality of features that can be used for the system check. The reference target is integrated into the metrology unit so that a separate reference wafer does not need to be loaded into the system.

In one embodiment, at least one parameter of a plurality of production substrates is measured using a metrology unit. A reference target that is integrated into the metrology unit is moved to a measurement location and the metrology unit automatically performs a system check using the reference target. In one aspect, the system check automatically measures at least one parameter of at least one of the plurality of features on the reference target and compares the results to a desired value to determine if the metrology unit is within a desired specification. The measurement may be performed multiple times and a statistical metric automatically calculated where the statistical metric is compared to the desired value.

In another embodiment, a method includes automatically performing a diagnostic process on a metrology unit. The diagnostic process includes automatically testing at least one subcomponent of the metrology unit; and automatically generating a report of the results of the tests of the at least one subcomponent of the metrology unit. In another embodiment, the at least one subcomponent of the metrology unit is automatically modified based on the results of the diagnostic process.

In another embodiment, a method includes generating a correlation matrix between a first set of parameters used in an automatic system check of a metrology unit and a second set of parameters used in an automatic diagnosis of the metrology unit and modifying at least one of the automatic system check and the automatic diagnosis based on the correlation matrix. In some another embodiment, the correlation matrix is between a set of parameters used in the metrology of a processed wafer in the metrology unit and a set of parameters used in an automatic system check of a metrology and the metrology recipe for a processed wafer is modified based on the correlation matrix.

DETAILED DESCRIPTION

Figure 1:
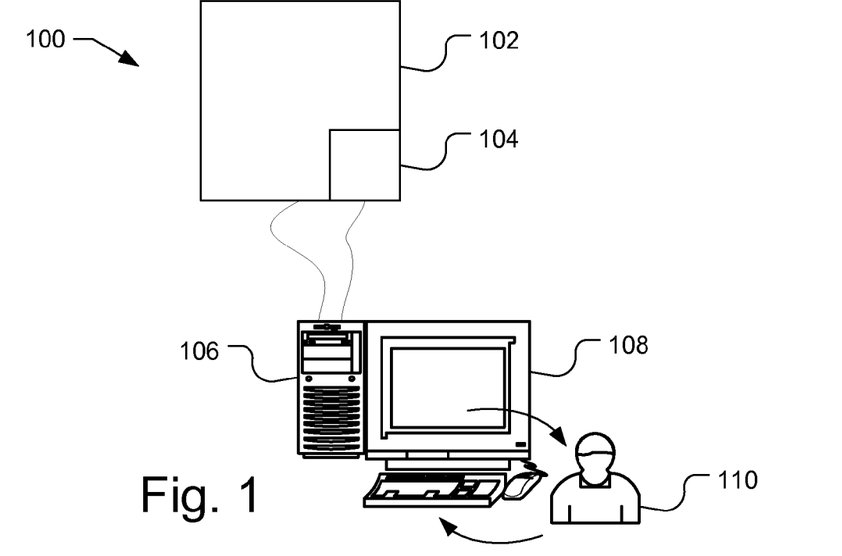
FIG. 1 illustrates an integrated metrology system including a processing station and a metrology unit that is integrated with the processing station.

FIG. 1 illustrates an integrated metrology system 100 including a processing station 102 and a metrology unit 104 that is integrated with the processing station 102. The metrology unit 104 may be physically attached to the processing station 102 and may be either on the factory side or the processing side of the processing station 102. The processing station 102 and metrology unit 104 are connected to a computer 106, which is used, e.g., to receive the measured information from metrology unit and to adjust the processing parameters in processing station 102 in a feed forward or feed back loop. FIG. 1 also illustrates a user interface 108 and a user 110, which may be, e.g., a processing engineer or a service engineer for the metrology unit 104.

Figure 2A:
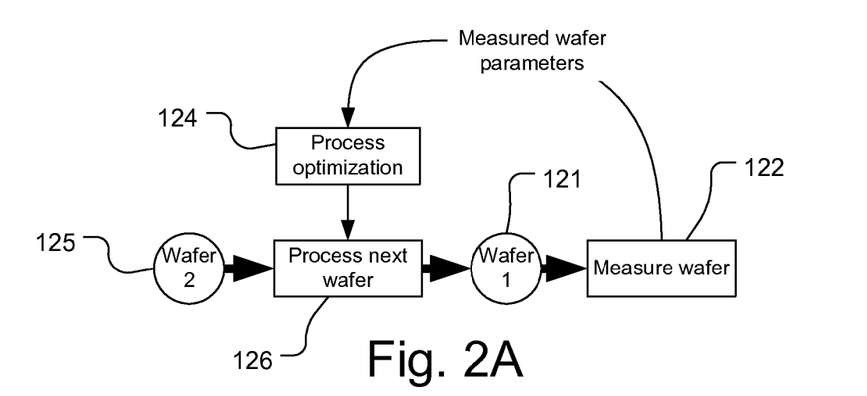
FIGS. 2A and 2B illustrate examples of Advanced Process Control (APC) in a feed back and feed forward configuration, respectively.
Figure 2B:
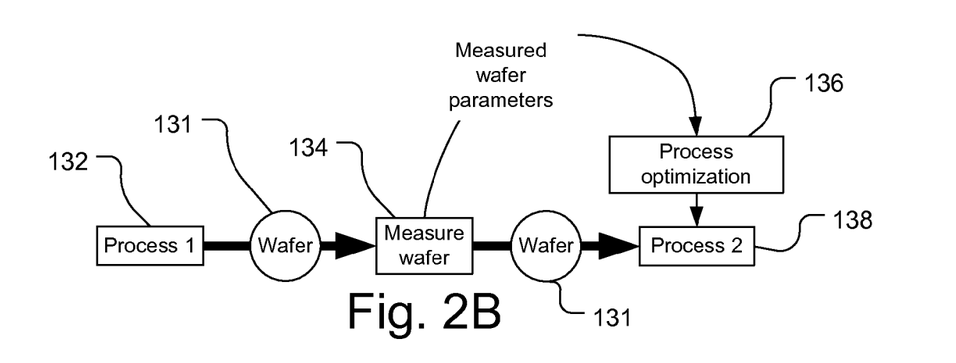

FIGS. 2A and 2B illustrate examples of Advanced Process Control (APC) in a feed back and feed forward configuration, respectively, using an integrated metrology unit, such as unit 104 shown in FIG. 1. As illustrated in FIG. 2A, in a feed back configuration, after processing (block 126), a first wafer 121 is measured by metrology unit 104 (block 122). The measured wafer parameters are then received, e.g., by the computer 106, and the process (block 126) is optimized (block 124) based on the measured parameters. A second wafer 125 is then processed (block 126) using that optimization.

FIG. 2B illustrates an example of a feed forward configuration using an integrated metrology unit, in which a wafer 131 is processed with a first process (block 132) and then measured (block 134). The measured wafer parameters are then received, e.g., by the computer 106, and the information is used to optimize (block 136) a subsequent process (block 138). The wafer 131 is then processed with the second process (block 138).

Figure 3:
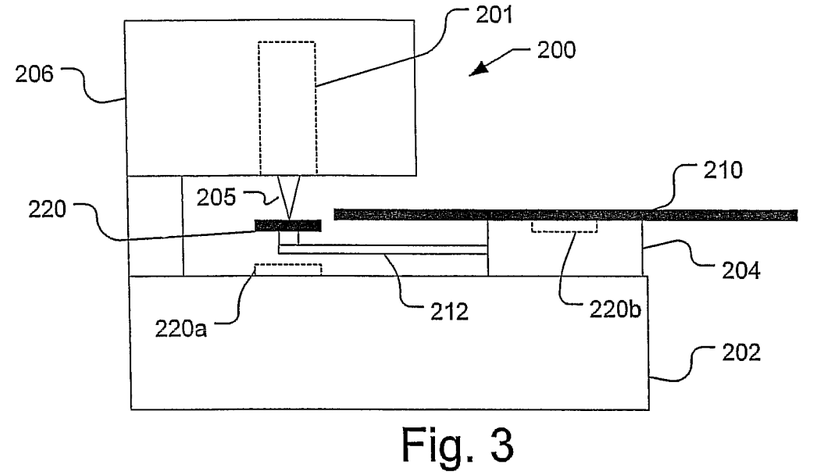
FIG. 3 illustrates a metrology unit with a built in reference target that may be integrated into a processing tool as illustrated in FIG. 1.

FIG. 3 illustrates a metrology unit 200 that may be integrated into a processing tool as illustrated in FIG. 1. The metrology unit 200 may be, e.g., a reflectometer, ellipsometer, scatterometer, spectrometer, interferometer, or any other desired type of metrology device. The metrology unit 200 is illustrated in FIG. 3 as including a base 202 that supports a stage 204 and a housing 206 for the optics 201, which produce a probe beam 205. The stage 204 holds the production wafer 210 and is movable to place the production wafer 210 under the probe beam 205. For example, the stage 204 may move in the polar coordinate system, i.e., moving horizontally in the R, θ directions, or in the Cartesian coordinate system, i.e., moving horizontally in the X and Y directions. The stage 204 may move vertically as well. In other embodiments, the optics 201 in housing 206 or both the optics 201 and the stage 204 may move.

As illustrated in FIG. 3, the metrology unit 200 includes an integrated reference target 220, sometimes referred to as a standard target. The reference target 220 is used to perform automatic system checks of the system, e.g., the reference target 220 is used as a standard to check the system precision, stability and accuracy, in accordance with an embodiment of the present invention.

While some conventional metrology systems include a reference chip, such reference chips are different in form and function from the reference target 220. Typically conventional reference chips include a single thickness of film and are used to compensate for fluctuations in the light source. Conventional reference chips, however, do not provide information related to whether the metrology unit is performed within desired specifications and, thus, conventional standard wafers must be periodically loaded onto the metrology unit to check the system performance. The loading and unloading of the standard wafers in these conventional systems interferes with the system cycle and reduces throughput.

Integrating the reference target 220 into the metrology unit 200 advantageously avoids the need to introduce a separate reference wafer into the process tool every time a system check is to be performed. In one embodiment, the reference target 220 is positioned such that it can be located at the measurement location of the metrology unit, e.g., under the probe beam 205, while a production wafer 210 is held on the stage 204. For example, the reference target 220 may be held on an arm 212 that extends from the stage 204 and the stage 204 can be moved to position the reference target 220 under the probe beam 205. If desired, the reference target may be held in other manners, such as being mounted to the base 202 as opposed to the stage 204, as illustrated by reference target 220a with broken lines. In such a configuration, either the optics 201 or the reference target 220a should be movable, e.g., at least in the vertical direction. Alternatively, if desired, a reference target may be held on the stage 204 itself, i.e., without an extension arm 212, as illustrated by reference target 220b with broken lines. In such a configuration, the reference target 220b would not be accessible to the probe beam 205 while a production wafer 210 is on the stage 204.

Figure 4:
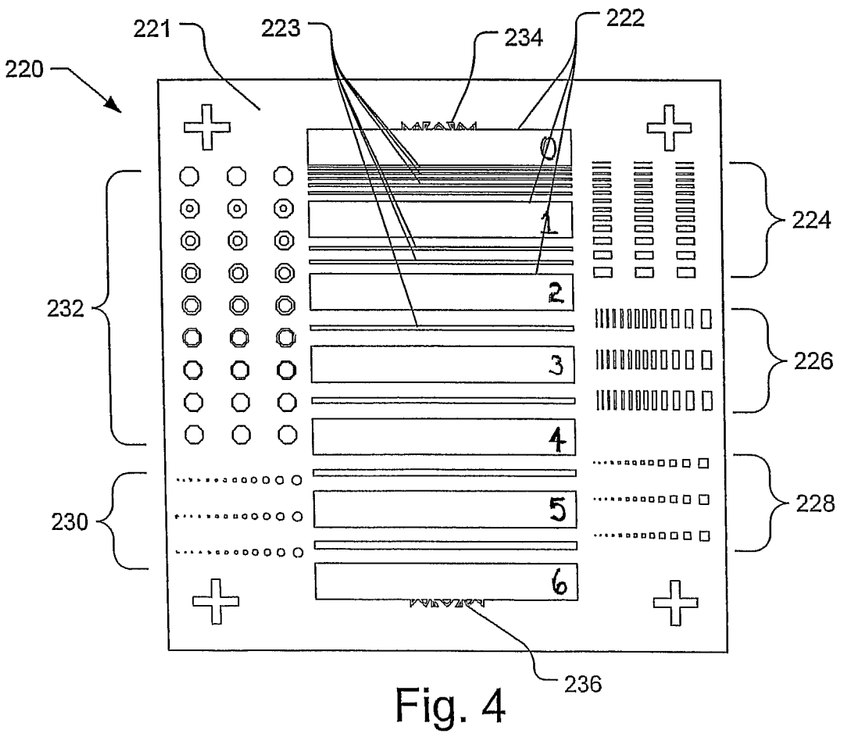
FIG. 4 illustrates a top view of a possible configuration of an integrated reference target.

FIG. 4 illustrates a top view of a possible configuration of a reference target 220. The reference target 220 may be, e.g., a silicon chip, approximately 6 mm×6 mm in size, with a uniform layer 221 of material, such as silicon dioxide that is 1,000 Å thick, and a plurality of reference features for characterization of the performance of the metrology unit. For example, the reference target 220 may include a number of elongated pads 222, which are thin film layers, e.g., of silicon dioxide, of different thicknesses ranging from about 2 nm to about 1,000 nm. These pads may be useful in calibrating a reflectometer or ellipsometer. The materials and thickness range of the pads 222 may be chosen to closely match the materials and thickness range of the materials that are being deposited or grown on the wafers by the process tool. For example, aluminum oxide, or stacks made up of more than one film, e.g., silicon nitride on top of silicon dioxide, may be used. The pads 222 may also be conductive films of differing thickness, resistivity, grain size, magnetic properties. The bars 223 that are between the pads 222 are for spot size measurement in one direction. In some systems, there may be a limitation of movement of the reference target 220, i.e., there may be no movement to the left or right, but only front to back. In such a system, the bars 223 can be used determine the size of a symmetrical spot or the size in one direction of an asymmetrical spot.

The reference target 220 may also include other features. For example, pads 224 and 226 are three sets of horizontal and vertical rectangles, respectively, where each set has a different thickness and within each set is a plurality of rectangles with differing widths. Pads 224 and 226 may be formed from silicon dioxide or any other desired material. The pads 224, 226 may be used, e.g., to measure the spot size. The horizontal and vertical rectangles are used because the spot may not be round.

Another group of pads 228 include three sets of squares, which may be used to measure round or symmetrical spots. Each set of pads 228 have a different thickness, where each set has a different thickness and each set has a plurality of squares with differing areas. The use of different thicknesses provides different contrast values compared to the surrounding material, while the differing widths enable the measurement of the spot size in one direction. Another group of pads 230 are similar to pads 228, but are circles as opposed to squares. Another group of pads 232 include three sets of octagons, which may be used to measure asymmetrical spots in 4 or 8 directions. The octagons 232 may be formed, e.g., with concentric internal octagons, that have the same thickness as the uniform layer 221, which permits a more deconvoluted determination of the spot shape.

The reference target 220 may also include patterns 234 and 236 for pattern recognition. The use of pattern recognition is advantageous as it enables the metrology system to find any desired feature on the reference target 220 with a high degree of accuracy. Moreover, the patterns 234, 236 can be used to check the pattern recognition functionality of the metrology system. Further, the patterns 234 and 236 can be used to determine if there is system problem related to the head moving with respect to the stage or if the stage is a problem going to a specific position.

Figure 5A:
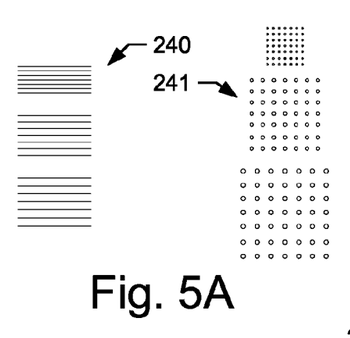
FIGS. 5A-5F illustrate various reference features that may be used on the reference target.
Figure 5B:
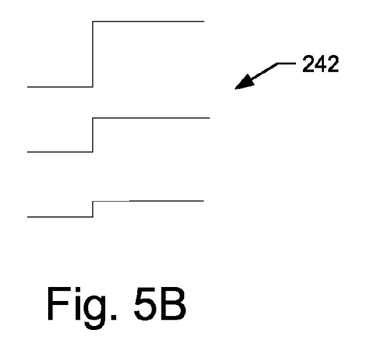
Figure 5C:
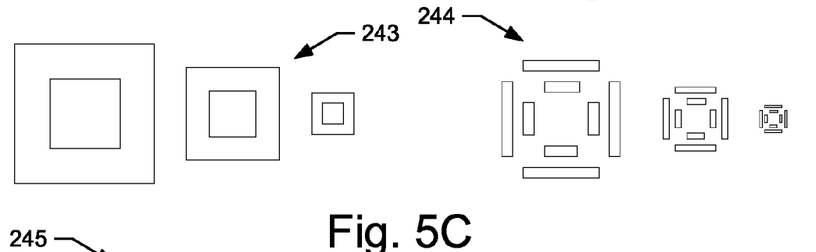
Figure 5D:
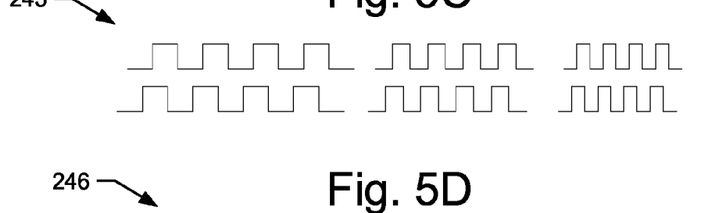
Figure 5E:
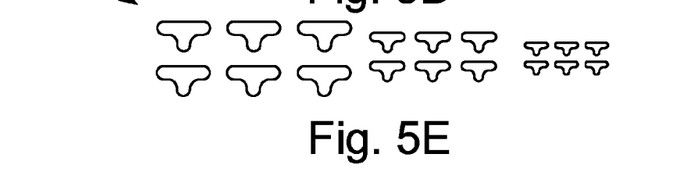
Figure 5F:
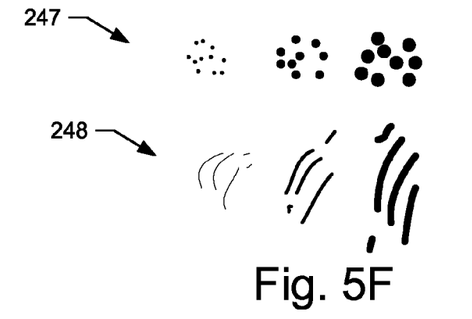

Other features can be included in the reference target 220 as desired. For example, FIG. 5A illustrates a plurality of reference features 240 that may be used for 2D critical dimension (CD) measurements and reference features 241 that may be used for 3D CD measurements. Other three dimensional features may also be included on the reference target 220, such as the 3D features 246 show in plan view in FIG. 5E. The reference target 220 may include z-features, as shown in FIG. 5B, which shows side views of step height features 242. Features 242 may be single, e.g., opaque, material steps or multiple material steps, i.e., where the steps have different material on either side of the step. The reference target 220 may include features for measuring overlay, such as the box-in-box features 243 or bar-in-bar features 244 shown in FIG. 5C, or the diffraction based overlay features 245, shown in side view in FIG. 5D. The reference target may also include features that simulate defects, such as features 247 or features 248 shown in FIG. 5F. The defect features 247 may be, e.g., micro-circles of a known diameter, while the defect features 248 may be simulated scratches that are etched in the reference target 220. Similar to the features described in reference to FIG. 4, it should be understood that each of the plurality of the features 240-248 may be varied in size, thickness, alignment, or any other desired parameter to provide a useful reference for the metrology unit. While each of the features 240-248 appear in sets of three, the number of features in a set may be increased or decreased. Additional optical or non-optical features may also be included in the reference target 220, including, e.g., bright field features, video calibration features, field of view calibration features and features for film capacitances, sheet resistance, dielectric stacks, conductive films, conductive film stacks, combination of dielectric and conductive stacks, magnetic films, magnetic film stacks, optical parameters n and k, etc.

Figure 6:
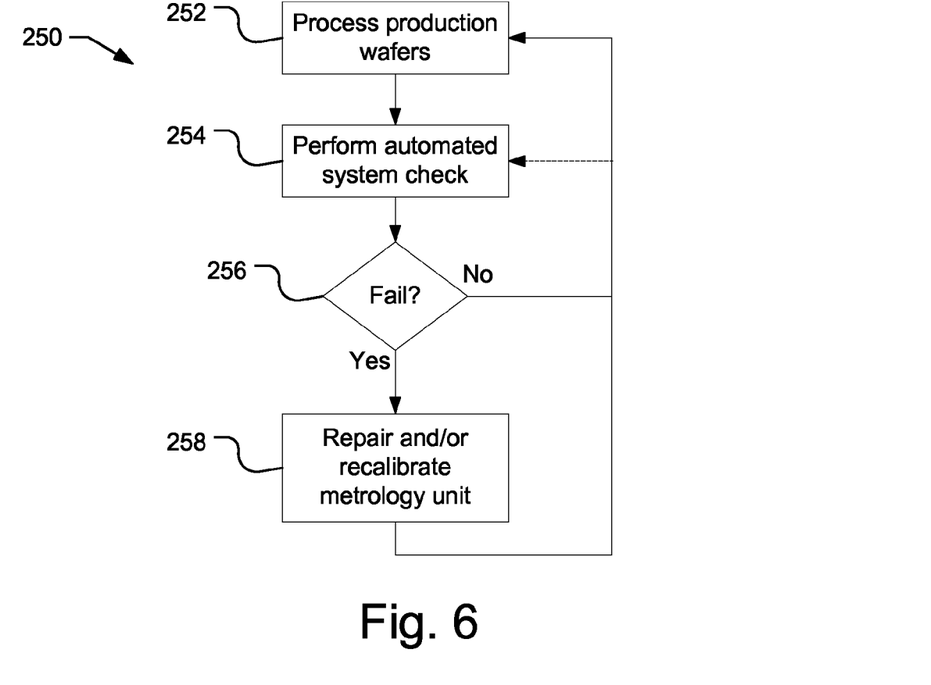
FIG. 6 is a flow chart illustrating an automated system check in accordance with an embodiment of the present invention.

In one embodiment, the measurement stability, precision and accuracy of the metrology unit 200 is automatically measured and compared to predetermined specifications using the reference target 220. This automated system check can be used to automatically identify problems with the metrology unit 200. FIG. 6 is a flow chart 250 illustrating an automated system check in accordance with an embodiment of the present invention. As shown in FIG. 6, after a number of production wafers are processed (block 252), or after a desired time has elapsed, an automated system check is performed (block 254) using the reference target 220. By way of example, the metrology unit 200 may measure the thickness of a film on the reference target 220. If the metrology unit does not fail the system check (block 256), processing of the production wafers continues until the next automatic system check. However, if the metrology unit fails the system check (block 256), e.g., indicates that the measured feature has an incorrect thickness, the metrology unit requires modification, such as repair, recalibration, reconfiguration or realignment (block 258), which in one embodiment is performed by, e.g., a service engineer or technician. After the repair and/or recalibration of the metrology unit, the process repeats.

In one embodiment, the automated system check can be tracked over time, which enables the identification of problems with the metrology unit 200 ahead of time. Identifying problems with the metrology unit 200 ahead of time helps eliminate incorrect adjustments of the process parameters. For example, if the measurement may become less precise immediately before a light source fails, when it is recognized that precision is degrading, the light source can be checked or replaced, or other preventative maintenance may be performed to avoid a light source problem.

Figure 7:
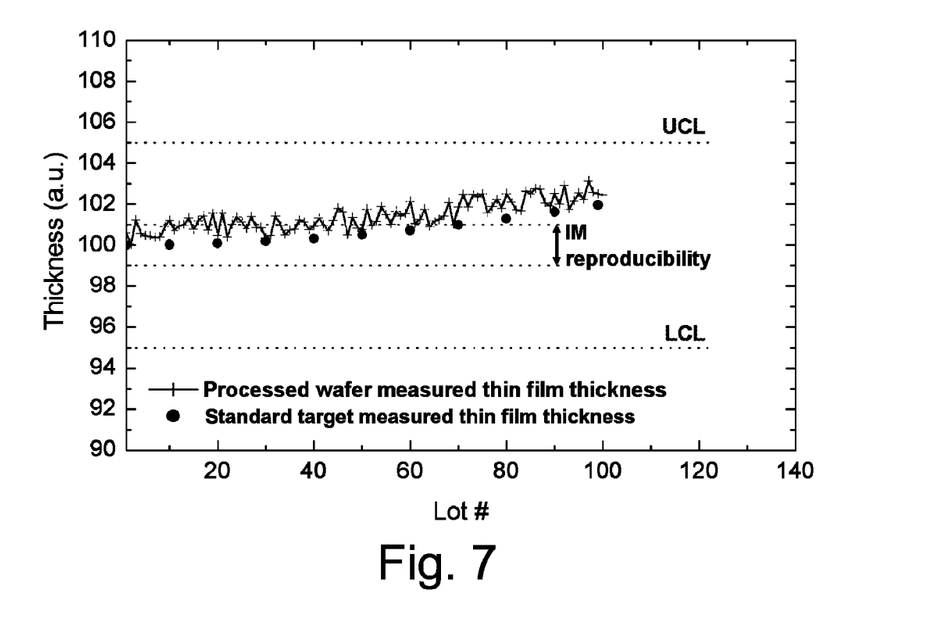
FIG. 7 is a graph that illustrates the changes in the measured thickness of the film on the reference target and the films deposited on processed wafers over time.

FIG. 7 is a graph that illustrates the changes in the measured thickness of the film on the reference target (illustrated as dots) over time and the films deposited on processed wafers (illustrated as plus signs connected with a line) by lot number, where LCL and UCL are the Lower Control Limit and Upper Control Limit, respectively, of the process control. As shown in FIG. 7, the measured thickness of the films on processed wafers can be seen to increase over time. The illustrated increase in measured thickness may lead to the conclusion that the deposition process is drifting, which may lead to an incorrect adjustment of the process parameters in an attempt to control the drift. However, as shown in FIG. 7, the measured thickness of the film on the reference target similarly increases over time; indicating that the observed change in thickness of the films on the processed wafers may be the result of instability in the metrology unit as opposed to drift in the process parameters. Thus, once the measured thickness for the reference target is outside the IM reproducibility range, between 99 and 100 a.u., the metrology unit would fail the system check (block 256 in FIG. 6), and the metrology unit is in need of repair or recalibration. Accordingly, by monitoring the measured thickness of the reference target, inappropriate adjustments to process parameters can be avoided.

By storing and analyzing the automated system check results, statistical information such as average and standard deviation may be derived. The statistical information can be used to identify trends in the measurements after only a few automated system checks. Thus, instead of waiting for the metrology unit to fail the system check, the metrology unit (or computer 106 in FIG. 1) could automatically warn the user that a drift on the metrology unit has been identified, thereby giving the user the option of taking precautionary actions before the metrology unit is out of specifications.

Figure 8:
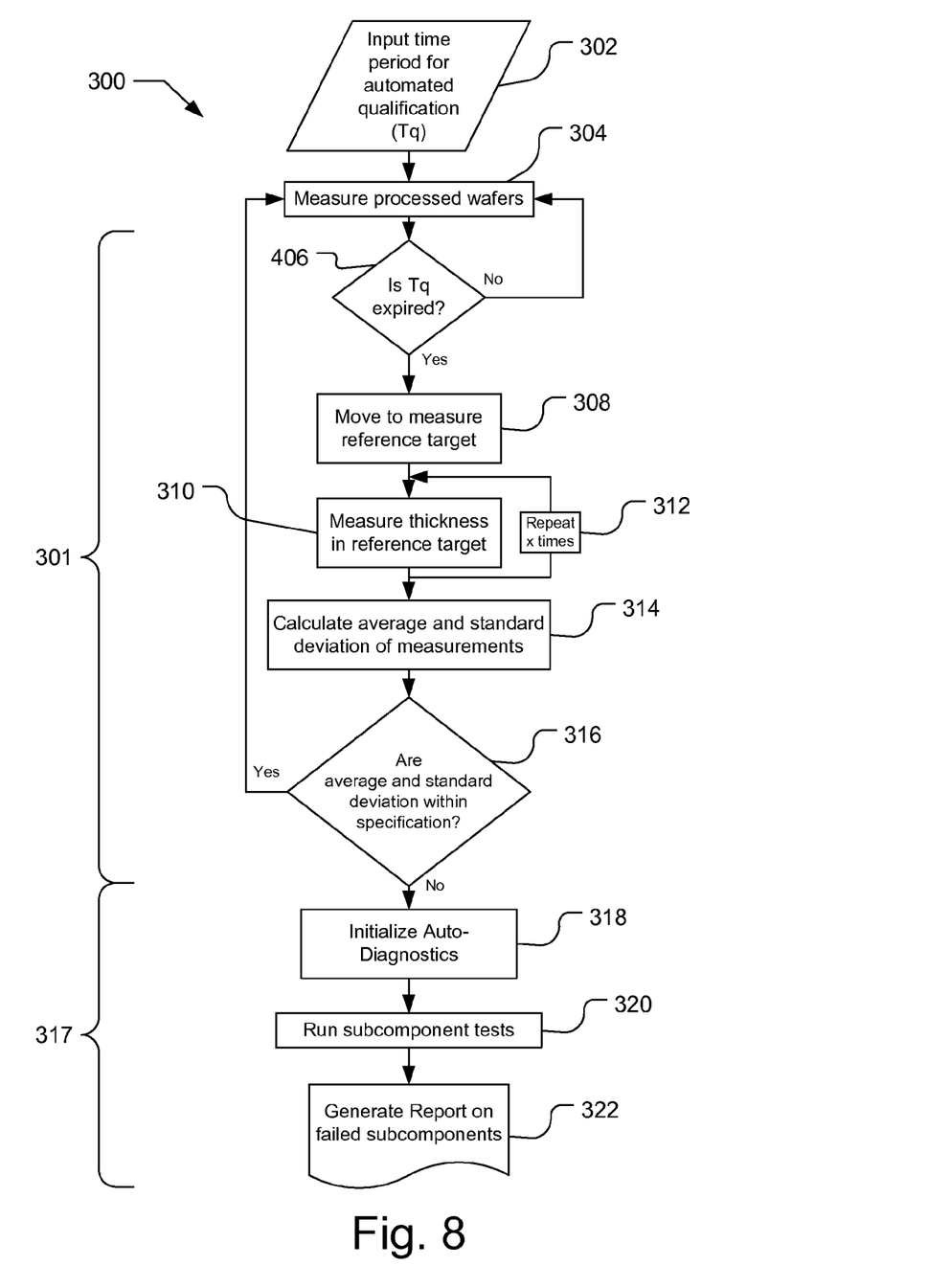
FIG. 8 is a flow chart illustrates a system check that includes an automated system check process and automated diagnosis process.

FIG. 8 is a flow chart 300 illustrates another embodiment of the present invention in which the metrology unit undergoes an automated system check 301 and, when appropriate, an automated diagnostic process 317, e.g., to determine the cause of a system check failure. As illustrated in FIG. 8, a time period (Tq) is set to begin the automated system check process (block 302). The time period Tq may be set, e.g., by user 110 through the interface 108 illustrated in FIG. 1. It should be understood that the time period need not be specifically time, but may be another useful parameter such as the number of wafers or lots processed. Thus, as illustrated by blocks 304 and 306 in FIG. 4, processed wafers are measured until the time period Tq has expired.

Once the automated system check begins, the reference target 220 is moved to the measurement location (block 308), e.g., illustrated by probe beam 205 in FIG. 1. A predetermined number of measurements of one or more of the pre-selected areas on the reference target 220 are then measured, as illustrated by blocks 310 and 312. In one embodiment, the thickness of the pre-selected pads 222 is measured, as shown in block 310. However, the present invention is not limited to thickness measurements and, if desired, other parameters of the pads 222, such as critical dimension, or other areas on the reference target 220 may be measured according to an embodiment of the present invention.

Statistical parameters, such as the average and standard deviation, are then calculated based on the measurements of the reference target 220 (block 314). The calculated statistical parameters are compared to predetermined values to determine if the metrology unit is within specification (block 316). For example, the calculated standard deviation is compared to a standard deviation range to determine if the metrology tool has the desired precision, while the calculated average can be compared to a thickness range to determine if the metrology tool is meeting stability and accuracy requirements. If the metrology tool is found to be within the desired specifications, the process flows back to measuring processed wafers (block 304) until the next time period Tq expires (block 406), when the automated system check process is performed again.

If, however, the automated system check process 301 indicates that the metrology unit is out of specifications, an automated diagnostic process 317 is performed. The automated diagnostic process 317 is used to determine which subcomponents in the metrology unit may be at fault for the automated system check failure. Thus, as shown in FIG. 8, if the metrology unit fails to meet the desired specifications (block 316), the automated diagnostic process is initialized (block 318). It should be understood that the automated diagnostic process 317 may be performed even if the metrology unit is not out of specification, e.g., the diagnostic process 317 may be performed periodically, or if the system check indicates that further optimization of the metrology unit is possible even though the metrology unit is within specifications.

Initialization of the automated diagnostic process may include, e.g., preparing the metrology unit for the subcomponent tests. A series of diagnostic tests are then automatically run for each subcomponent (block 320). In one embodiment, the reference target that was used for the automated system check process is also used for at least some of the test performed in the automated diagnostic process. If desired, however, separate reference targets may be used for automated system check and automated diagnostic processes. Different elements on the reference target may be used to test different subcomponents of the metrology tool. For example, the reference target 220 shown in FIG. 4, includes features of different sizes that may be used to evaluate probe size characterization, and includes patterned features that can be used to evaluate position accuracy, as described above.

The subcomponent parameters measured during the automated diagnostic process are generally dependent on the type of metrology unit being used, but examples include detector noise, light source stability, focus repeatability, stage speed, stage accuracy, moving components repeatability, humidity, and temperature. Of course, additional, fewer or different subcomponent parameters may be inspected if desired.

The results of the subcomponent tests may then be reported, e.g., on an interface such as interface 108 in FIG. 1. The report may provide simply the raw data on the subcomponent tests or e.g., a table of pass and fail results (block 322). The user, e.g., a service engineer, can receive the report from the automated diagnostic tests and repair or recalibrate the metrology unit appropriately. By determining which subcomponents in the metrology unit are causing the failure of the automated system check failure, the service engineer does not need to perform the tests. Accordingly, the Mean Time To Repair (MTTR) is reduced, since a service engineer will receive the report without having to run the tests. Additionally, because the tests that are performed in the automated diagnosis process are always the same, troubleshooting is more systematic and less based on human interpretation. Moreover, the uniformity of the tests in the automated diagnostics is advantageous in creating a database based on many metrology tools, which can enable faster identification of common failures, thereby improving design performance and reliability.

In addition, with the identification of specific subcomponents that failed the automated diagnostic process, an automated modification, e.g., recalibration, reconfiguration, realignment, etc., of those subcomponents is possible. For example, if all subcomponent tests pass, but one, such as thick film measurement stability, the wavelength calibration should be recalibrated. Other examples include tuning the metrology unit's temperature control subsystem if the temperature is not stable or adjusting the gain and integration time of the spectrometer detector if the lamp intensity is too low. Thus, referring to FIG. 6, the modification of the metrology unit (block 258) is performed automatically. With an automatic modification, it may be desirable to perform another automated system check (block 254), e.g., including the automated system check and, if necessary, the automated diagnostic process, prior to measuring processed wafers (as indicated by the broken arrow).

In another embodiment of the present invention, the automated diagnosis process may be modified to vary the subcomponent tests to be run. For example, depending on what performance parameter failed in the automated system check process 301, the number of subcomponent tests can be reduced to a subset of tests targeted to identify the cause for the specific performance parameter failure. For instance, if the metrology unit fails accuracy, but not precision, only tests related to that accuracy, such as alignment and calibration of the metrology unit, would be run, and tests related to precision, such source and detector stability, need not be run. In addition, the particular tests that are run in the automated system check process and/or the automated diagnostic process may vary depending on the importance of a particular parameter, e.g., as specified by the user or service engineer.

Figure 9:
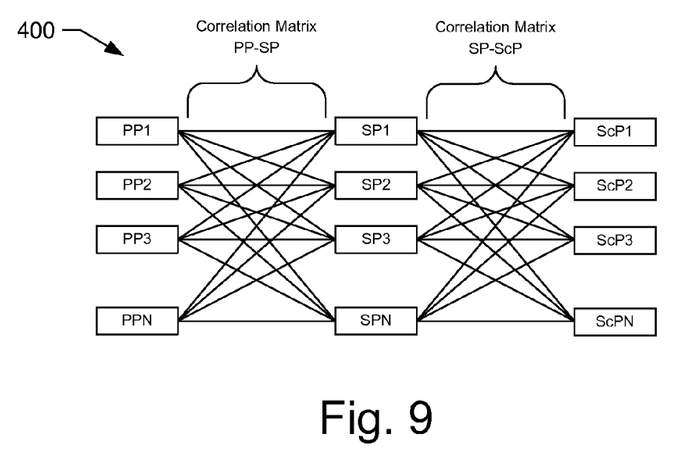
FIG. 9 illustrates an example of the correlations between multiple process parameters to multiple standard parameters and between the multiple standard parameters and multiple subcomponent parameters.

In one embodiment, the decision process regarding which particular tests to run in the automated system check process and/or the automated diagnostic process is based on correlations between the different tests as well as wafer processing parameters. FIG. 9 illustrates an example of a correlation matrix 400 mapping the correlations between multiple process parameters (PP1, PP2, PP3 . . . PPN) to multiple standard parameters (SP1, SP2, SP3 . . . SPN) and between the multiple standard parameters and multiple subcomponent parameters (ScP1, ScP2, ScP3 . . . ScPN). As shown, a correlation matrix (PP-SP) connects the process parameters to the standard parameters, and a second correlation matrix (SP-ScP) connects the standard parameters to the subcomponent parameters. Process parameters are the parameters for the metrology of the processed wafer and may include factors such as reproducibility, accuracy, and throughput. The standard parameters are parameters for the measurement of the reference target 220 and may include factors such as precision, stability, reproducibility, accuracy, and throughput. The subcomponent parameters are parameters for the measurements of the metrology subcomponents and may include, e.g., detector noise, light source stability, focus repeatability, stage speed, stage accuracy, moving components repeatability, humidity, and temperature. Of course, different parameters may be used and the specific parameters are generally dependent on the type of wafer processing and metrology that is performed.

Figure 10:
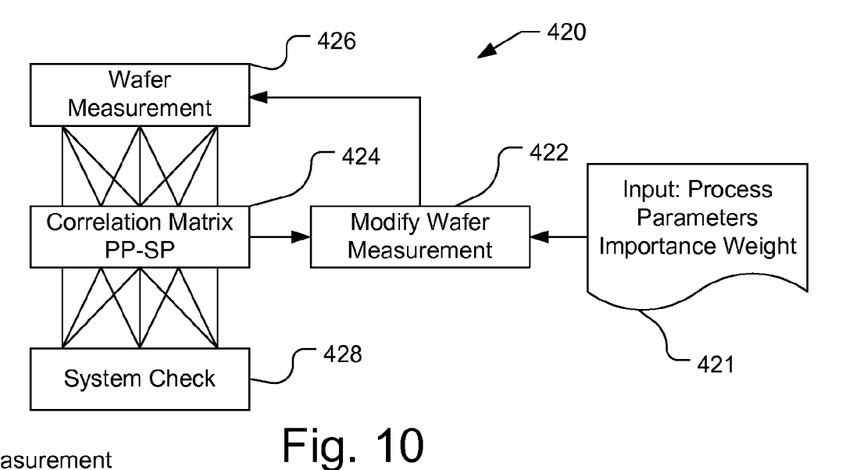
FIG. 10 is a flow chart illustrating an optimization of the wafer metrology that can be derived from correlations in the wafer metrology and the automated system check process.
Figure 11:
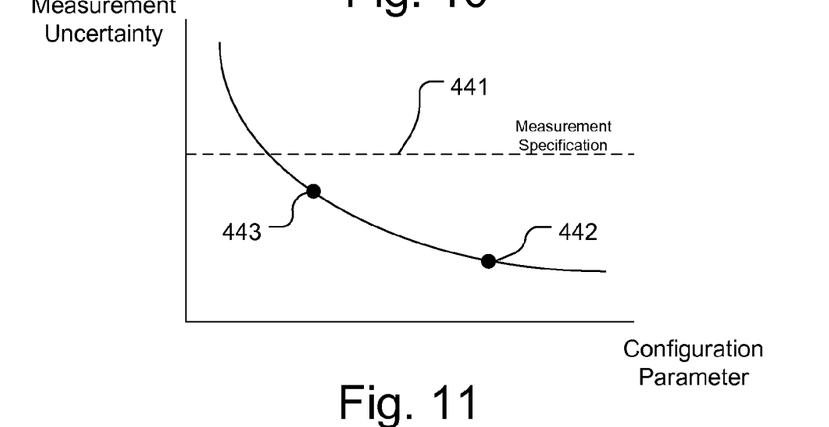
FIG. 11 shows a graph illustrating measurement uncertainty vs. configuration parameter.

FIG. 10 is a flow chart 420 illustrating an optimization of the wafer metrology that can be derived from the automated system check and automated diagnostic process. Optimization of the wafer metrology can provide, e.g., increased throughput, tighter wafer specifications, and faster automated system check. As illustrated in FIG. 10, a user inputs a weighting factor 421 for the importance of process parameters for the wafer measurement 426, e.g., into the computer 106 in FIG. 1. The correlation matrix PP-SP 424 between the parameters of the wafer measurement 426 and the system check 428 is also provided to the computer 106. Based on the importance of the process parameters and the correlation matrix, the wafer measurement can be modified 422, e.g., using well known optimization algorithms, such as genetic or survival of the fittest algorithms. By way of example of the present modification process, if the user indicates that throughput is more important than, e.g., precision, and the measurement of the reference target shows a precision in the metrology unit that is much better than the process control limits, the number of measurements in the wafer measurement recipe can be reduced to increase throughput and precision will still be within the desired specifications. By way of example, FIG. 11 shows a graph generally illustrating measurement uncertainty, e.g., precision, vs. configuration parameter, e.g., the number of measurements, where data points below the measurement specification line 441 are better than data points above the line 441. As can be seen in FIG. 11, as the configuration parameter, e.g., number of measurements, increases, the measurement uncertainty, e.g., precision, improves. Thus, if measurement of the reference target indicates that the measurement uncertainty is better than the specification (indicated by horizontal line 441 labeled measurement specification), the configuration parameter may be decreased. For example, the number of measurements can be decreased, which in the graph of FIG. 11, would be equivalent to moving from point 442 to point 443 on the curve. While the measurement uncertainty, e.g., precision, would worsen, it will still be better than the measurement specification. Of course, the wafer metrology can be modified by moving in the opposite direction on the curve in FIG. 11, e.g., from point 443 to point 442, e.g., where increased precision is desired. It should be understood that the measurement uncertainty and configuration parameter are not limited to precision and number of measurements.

Figure 12:
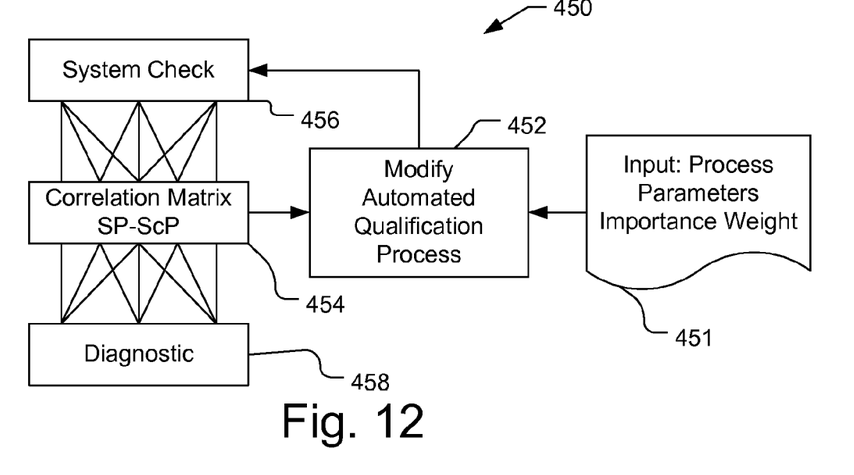
FIG. 12 is a flow chart illustrating an optimization of the automated system check process based on the correlations in the automated system check process and the automated diagnosis process.

FIG. 12 is a flow chart 450 illustrating an optimization of the automated system check process. Similar to the optimization process described in FIG. 10, a user inputs a weighting factor 451 for the importance of a process parameter, e.g., into the computer 106 in FIG. 1. The correlation matrix SP-ScP 454 between the parameters of the automated system check measurements 456 and the automated diagnostics measurements 458 is also provided. Based on the importance of the process parameters and the correlation matrix, the automated system check process or the metrology unit can be modified 452, e.g., using optimization routines such as genetic or survival of the fittest algorithms. An example of the present modification process is if throughput is more important than, e.g., precision, and the correlation to lamp noise is weak, the number of measurements of the reference target to generate an average may be reduced, which will improve throughput.

Figure 13:
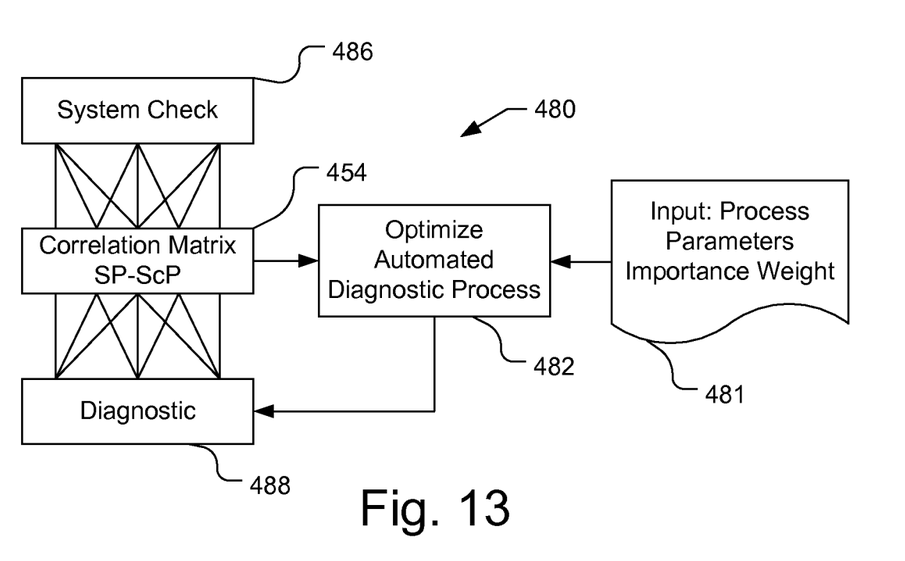
FIG. 13 is a flow chart illustrating an optimization process for the automated diagnostic process based on the correlations in the automated system check process and the automated diagnosis process.

FIG. 13 is a flow chart 480 illustrating an optimization process for the automated diagnostic process, which enables the elimination or a minimization of specific subcomponent tests, resulting in faster problem identification. Similar to the optimization process described in FIGS. 10 and 11, a user may input a weighting factor 481 for the importance of process parameters, e.g., into the computer 106 in FIG. 1. The correlation matrix SP-ScP 454 between the parameters of the automated system check 486 and the automated diagnostics process 488 is also provided. Based on the importance of the process parameters and the correlation matrix, the automated diagnostic process can be modified 482. By way of example, when the thin film measurement in the automated system check passes precision but not stability, the focus subcomponent may be tested while the lamp noise subcomponent may be ignored.

Figure 14:
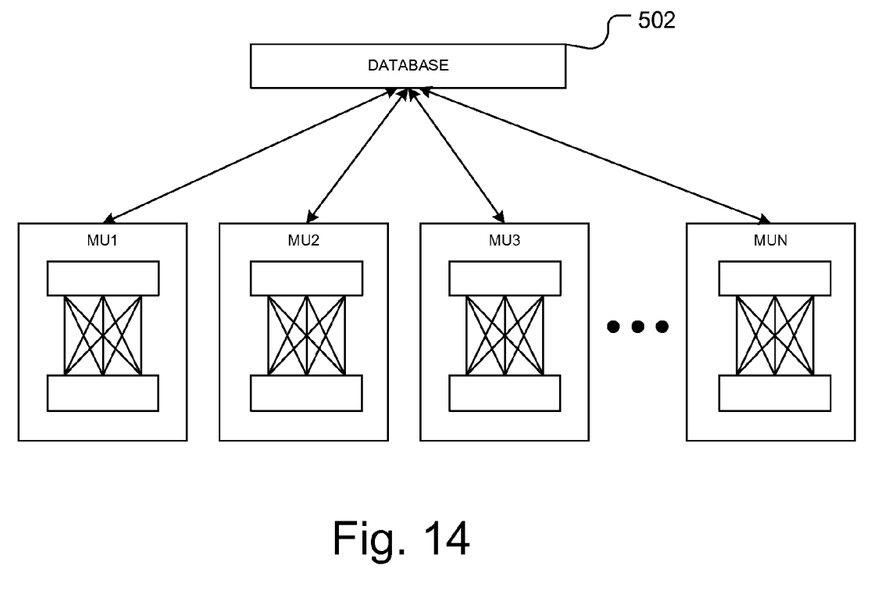
FIG. 14 schematically illustrates a database that is connected to a plurality of metrology units MU1, MU2, MU3, and MUN.

In accordance with another embodiment of the present invention, the information from a number of individual metrology units can be combined in a single database through an appropriate network configuration, e.g., through intranet and/or internet connections. The combined information can then be used in the optimization process in each of the separate metrology units. By way of example, FIG. 14 schematically illustrates a database 502 that is connected to a plurality of metrology units MU1, MU2, MU3, and MUN to receive data related to the optimization of the different metrology units, such as the correlation matrices. By combining the data from the different correlation matrices from each individual metrology unit, any single metrology unit, e.g., MU3 can consult other correlation matrices during an optimization process. Thus, if one metrology unit has a superior performance with respect to the other metrology units, the other metrology units can compare and optimize their configuration and correlation matrices with respect to the superior metrology unit. Alternatively, if a new metrology unit is added, the configurations and correlation matrices of the new metrology unit can be based on the older metrology units to minimize the training and optimization of the new metrology unit.

The data structures and software code for automatically implementing one or more acts described in this detailed description can be implemented by one of ordinary skill in the art in light of the present disclosure and stored on a computer readable storage medium, which may be any device or medium that can store code and/or data for use by a computer system such as computer 106 in FIG. 1. This includes, but is not limited to, magnetic and optical storage devices such as disk drives, magnetic tape, compact discs, and DVDs (digital versatile discs or digital video discs), and computer instruction signals embodied in a transmission medium (with or without a carrier wave upon which the signals are modulated). For example, the transmission medium may include a communications network, such as the Internet. In one embodiment, the carrier wave includes computer instruction signals for carrying out the above described process.

Although the present invention is illustrated in connection with specific embodiments for instructional purposes, the present invention is not limited thereto. Various adaptations and modifications may be made without departing from the scope of the invention. For example, the present invention may be used with different types of metrology units and different types of processing, including photomask and other such industries. Therefore, the spirit and scope of the appended claims should not be limited to the foregoing description.

What is claimed is:

1. A method comprising:

providing, to a computer coupled to a metrology unit, a correlation matrix between a first set of parameters used in an automatic system check of the metrology unit that checks performance of the metrology unit and a second set of parameters used in an automatic diagnosis of the metrology unit that determines a cause of a failure detected by the automatic system check; and modifying, by the computer, at least one of the automatic system check and the automatic diagnosis performed by the metrology unit based on the correlation matrix between the first set of parameters and the second set of parameters.

2. The method of claim 1, wherein the method further comprises providing a weight of at least one parameter of metrology of a processed wafer based on importance to the computer, wherein the modifying at least one of the automatic system check and the automatic diagnosis is further based on the provided weight.

3. The method of claim 2, wherein the at least one parameter is a metric of performance of the metrology unit and includes at least one of reproducibility, accuracy, throughput, tool matching, and precision.

4. The method of claim 1, wherein the first set of parameters used in the automatic system check are metrics of performance of the metrology unit and include at least one of reproducibility, accuracy, throughput, tool matching, and precision.

5. The method of claim 1, wherein the second set of parameters used in automatic diagnosis includes at least one of detector noise, light source stability, focus repeatability, stage accuracy, moving components repeatability, and temperature.

6. The method of claim 1, wherein the automatic system check is performed by the metrology unit using an integrated reference target having a plurality of reference features.

7. The method of claim 1, further comprising:

providing data related to the correlation matrix between the first set of parameters and the second set of parameters to a database that is coupled to a plurality of metrology units;

wherein modifying at least one of the automatic system check and the automatic diagnosis performed by the metrology unit with the computer based on the correlation matrix between the first set of parameters and the second set of parameters for a metrology unit is further based on data stored in the database.

* * * * *